United States Patent
Xu et al.

(10) Patent No.: US 12,185,323 B2
(45) Date of Patent: Dec. 31, 2024

(54) METHODS FOR DETERMINING UPLINK CONTROL INFORMATION (UCI) FIELD AND RELATED APPARATUS

(71) Applicant: GUANGDONG OPPO MOBILE TELECOMMUNICATIONS CORP., LTD., Guangdong (CN)

(72) Inventors: Jing Xu, Guangdong (CN); Yanan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 357 days.

(21) Appl. No.: 17/736,685

(22) Filed: May 4, 2022

(65) Prior Publication Data

US 2022/0264560 A1 Aug. 18, 2022

Related U.S. Application Data

(63) Continuation of application No. PCT/CN2020/094401, filed on Jun. 4, 2020.

(30) Foreign Application Priority Data

Nov. 7, 2019 (CN) .......................... 201911083760.2

(51) Int. Cl.
*H04W 72/21* (2023.01)
*H04L 1/1812* (2023.01)
(Continued)

(52) U.S. Cl.
CPC .......... *H04W 72/21* (2023.01); *H04L 1/1812* (2013.01); *H04L 5/0053* (2013.01); *H04W 72/0446* (2013.01); *H04W 72/23* (2023.01)

(58) Field of Classification Search
CPC ............ H04W 72/21; H04W 72/0446; H04W 72/23; H04L 1/1812; H04L 5/0053
See application file for complete search history.

(56) References Cited

U.S. PATENT DOCUMENTS

2017/0310447 A1* 10/2017 Kusashima .......... H04L 1/1861
2018/0242286 A1*  8/2018 Song .................... H04L 1/0072
2019/0103943 A1   4/2019 Wang et al.

FOREIGN PATENT DOCUMENTS

CA         2789366       8/2011
CN       107210889       9/2017
(Continued)

OTHER PUBLICATIONS

IPI, Office Action for IN Application No. 202217029773, Sep. 9, 2022.
Panasonic, "HARQ-ACK codebook for CBG-based transmission," 3GPP TSG RAN WG1 Meeting 91, R1-1720498, Nov. 2017.
EPO, Extended European Search Report for EP Application No. 20884914.1, Nov. 11, 2022.
(Continued)

*Primary Examiner* — Brenda H Pham
(74) *Attorney, Agent, or Firm* — Hodgson Russ LLP

(57) ABSTRACT

A method for determining an uplink control information (UCI) field and related apparatus are provided. The method includes the following. A terminal receives at least two Hybrid Automatic Repeat reQuest-acknowledgement (HARQ-ACK) feedback configurations. The terminal receives first downlink control information (DCI), where a first information field in the first DCI has a length determined by the at least two HARQ-ACK feedback configurations, and the first information field is a field related to uplink control feedback in the first DCI.

11 Claims, 5 Drawing Sheets

(51) Int. Cl.
    *H04L 5/00*      (2006.01)
    *H04W 72/0446*      (2023.01)
    *H04W 72/23*      (2023.01)

(56) References Cited

FOREIGN PATENT DOCUMENTS

| | | |
|---|---|---|
| CN | 108293253 | 7/2018 |
| CN | 108809610 | 11/2018 |
| CN | 109392169 | 2/2019 |
| CN | 109586877 | 4/2019 |
| CN | 110035550 | 7/2019 |
| CN | 110235396 | 9/2019 |
| WO | 2019099670 | 5/2019 |

OTHER PUBLICATIONS

Huawei et al., "UCI enhancements for URLLC," 3GPP TSG RAN WG1 Meeting #96b, R1-1903955, Apr. 2019.
WIPO, International Search Report for PCT/CN2020/094401, Aug. 28, 2020.
MCC Support, "Draft Report of 3GPP TSG RAN WG1 #98bis v0.1.0 (Chongqing, China, Oct. 14-20, 2019), " 3GPP TSG RAN WG1 Meeting #99, R1-191xxxx, Nov. 2019.
EPO, Communication for EP Application No. 20884914.1, Jun. 22, 2023.
CNIPA, First Office Action for CN Application No. 202210518646.3, Jun. 14, 2023.
JPO, Office Action for JP Application No. 2022-526207, Jul. 9, 2024.

\* cited by examiner

METHODS FOR DETERMINING UPLINK CONTROL INFORMATION (UCI) FIELD AND RELATED APPARATUS

CROSS-REFERENCE TO RELATED APPLICATION(S)

This application is a continuation of International Application No. PCT/CN2020/094401, filed Jun. 4, 2020, which claims priority to Chinese Patent Application No. 201911083760.2, filed Nov. 7, 2019, the entire disclosures of which are incorporated herein by reference.

TECHNICAL FIELD

This application relates to the technical field of communication, and in particular to methods for determining an uplink control information (UCI) field and a related apparatus.

BACKGROUND

In a long term evolution (LTE) Release-8 (R8) wireless communication system, in order to support technologies such as dynamic scheduling, downlink multiple input multiple output (MIMO) transmission, and Hybrid Automatic Repeat reQuest (HARQ), a terminal needs to feedback a variety of uplink control information (UCI) to a base station through a physical uplink control channel (PUCCH) and a physical uplink share channel (PUSCH). For example, the UCI may be a channel quality indicator, a coding matrix indicator, acknowledgement information for HARQ, etc. Specifically, the UCI fed back through the PUSCH includes channel quality information (CQI), a rank indication (RI), and a HARQ-acknowledgment (HARQ-ACK).

A UCI field is related to uplink control feedback. The UCI field should be suitable for a corresponding HARQ-ACK codebook configuration. That is, the UCI field should be designed to enable the UCI field to support a corresponding HARQ-ACK codebook.

SUMMARY

Implementations of the present application provide methods for determining an uplink control information (UCI) field and a related apparatus.

In a first aspect, implementations of the present application provide a method for determining a UCI field. The method includes the following. A terminal receives at least two HARQ-ACK feedback configurations. The terminal receives first DCI, where a first information field in the first DCI has a length determined by the at least two HARQ-ACK feedback configurations, and the first information field is a field related to uplink control feedback in the first DCI.

In a second aspect, implementations of the present application provide a terminal. The terminal includes a transceiver, at least one processor, and a memory storing one or more programs which, when executed by the at least one processor, cause the at least one processor to carry out the method of the first aspect.

In a third aspect, implementations of the present application provide a network device. The network device includes a transceiver, at least one processor, and a memory storing one or more programs which, when executed by the at least one processor, cause the at least one processor to carry out the method of the second aspect.

BRIEF DESCRIPTION OF THE DRAWINGS

In order to more clearly describe technical solutions in implementations of the present application, the following will briefly introduce the accompanying drawings required in description of the implementations or the prior art. Obviously, the accompanying drawings in the following description are only some implementations of the present application. Those of ordinary skill in the art can obtain other drawings based on these drawings without creative work.

DETAILED DESCRIPTION

Figure 1:
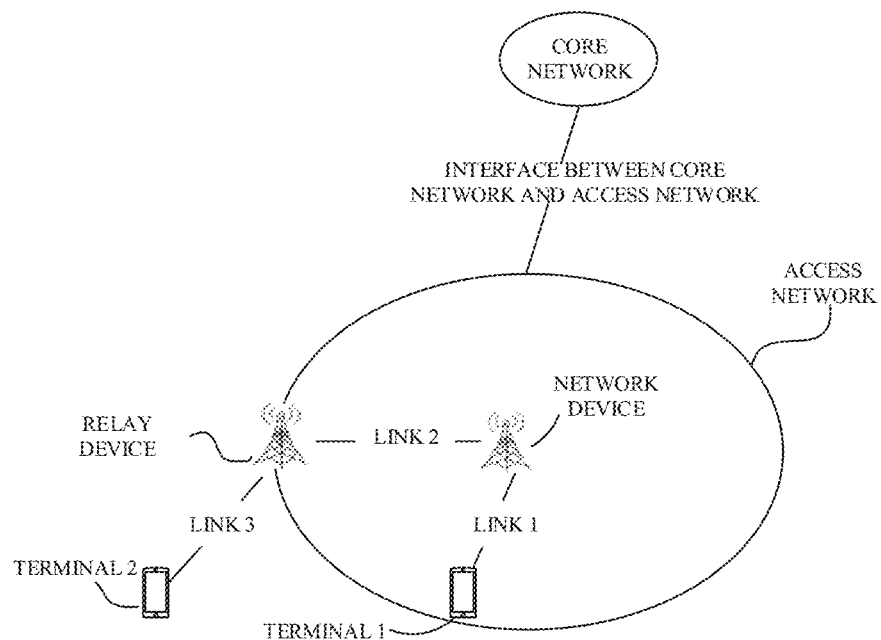
FIG. 1 is a schematic diagram of a communication system designed in implementations of the present application.

In order to enable those skilled in the art to better understand solutions of the present application, the technical solutions in the implementations of the present application will be clearly and completely described below in conjunction with the drawings in the implementations of the present application. Obviously, the described implementations are only a part of rather than all the implementations of the present application. Based on the implementations in the present application, all other implementations obtained by those of ordinary skill in the art without creative work shall fall within the protection scope of the present application.

The terms "first", "second", etc. in the specification and claims as well as the above-mentioned drawings of the present application are used to distinguish different objects, rather than to describe a specific sequence. In addition, the terms "including" and "having" and any variations thereof are intended to cover non-exclusive inclusions. For example, a process, method, system, product, or device that includes a series of steps or units is not limited to the listed steps or units, but optionally includes unlisted steps or units, or optionally further includes other steps or units inherent to the process, method, product, or device.

Reference to "implementation" herein means that a specific feature, structure, or characteristic described in conjunction with the implementation may be included in at least one implementation of the present application. The appearance of the phrase in various places in the specification does not necessarily refer to the same implementation, nor is it an independent or alternative implementation mutually exclusive with other implementations. Those skilled in the art explicitly and implicitly understand that the implementation described herein can be combined with other implementations.

The technical solutions of the implementations of the present application can be applied to various communication systems, such as a global system for mobile communications (GSM) system, a code division multiple access (CDMA) system, a wideband code division multiple access (WCDMA) system, a general packet radio service (GPRS) system, a long term evolution (LTE) system, a LTE frequency division duplex (FDD) system, a LTE time division duplex (TDD) system, an universal mobile telecommunication system (UMTS), a worldwide interoperability for microwave access (WiMAX) communication system, a future 5th generation (5G) system or new radio (NR) system, etc.

A terminal in the implementations of the present application may refer to user equipment, an access terminal, a user unit, a user station, a mobile station, a mobile station, a remote station, a remote terminal, a mobile device, a user terminal, a terminal, a wireless communication device, a user agent, or a user device. The terminal can also be a cellular phone, a cordless phone, a session initiation protocol (SIP) phone, a wireless local loop (WLL) station, a personal digital assistant (PDA), and a handheld device with wireless communication function, a computing device or other processing devices connected to wireless modems, a relay device, an in-vehicle device, a wearable device, a terminal in the future 5G network, or a terminal in future evolved public land mobile network (PLMN), etc., which is not limited in the implementations of the present application.

The network device in the implementations of the present application may be a device used to communicate with a terminal. The network device may be a base transceiver station (BTS) in a GSM or CDMA system, or a NodeB (NB) in a WCDMA system, or an evolved NodeB (eNB or eNodeB) in an LTE system, or a wireless controller in a cloud radio access network (CRAN) scenario. Alternatively, the network device may be a relay device, an access point, an in-vehicle device, a wearable device, a network device in the future 5G network or a network device in the future evolved PLMN network, one or a group of (including multiple antenna panels) antenna panels of the base station in the 5G system, or a network node that constitutes a gNB or transmission point, such as a baseband unit (BBU), or a distributed unit (DU), etc., which is not limited in the implementations of the present application.

In some deployments, the gNB may include a centralized unit (CU) and a DU. The gNB may also include an active antenna unit (AAU). The CU realizes part of functions of the gNB, and the DU realizes part of the functions of the gNB. For example, the CU is responsible for processing non-real-time protocols and services, and implements functions of radio resource control (RRC) and packet data convergence protocol (PDCP) layers. The DU is responsible for processing physical layer protocols and real-time services, and realizes functions of the radio link control (RLC) layer, media access control (MAC) layer, and physical (PHY) layer. The AAU realizes some physical layer processing functions, related functions of radio frequency processing and active antennas. Since information of the RRC layer will eventually become information of the PHY layer, or be transformed from the information of the PHY layer, under this architecture, higher layer signaling, such as RRC layer signaling, can also be considered to be transmitted by the DU, or transmitted by the DU+AAU. It can be understood that the network device may be a device including one or more of a CU node, a DU node, and an AAU node. In addition, the CU can be classified as network equipment in a radio access network (RAN), and the CU can also be classified as network equipment in a core network (CN), which is not limited in the present application.

In the implementations of the present application, the terminal or network device includes a hardware layer, an operating system layer running on the hardware layer, and an application layer running on the operating system layer. The hardware layer includes hardware such as a central processing unit (CPU), a memory management unit (MMU), and a memory (also referred to as main memory). An operating system may be any one or more computer operating systems that implement service processing through processes, for example, a Linux operating system, a Unix operating system, an Android operating system, an iOS operating system, or a windows operating system. The application layer includes applications such as a browser, an address book, word processing software, and instant messaging software. Moreover, the implementations of the present application do not specifically limit a specific structure of an execution body of a method provided in the implementations of the present application, as long as the execution body can perform communication according to the method provided in the implementations of the present application by running a program recording codes of the method provided in the implementations of the present application. For example, the execution body of the method provided in the implementations of the present application may be a terminal, or a functional module in the terminal that can invoke and execute the program.

In addition, various aspects or features of the present application can be implemented as methods, devices, or products using standard programming and/or engineering techniques. The term "products" used in the present application encompasses a computer program accessible from any computer-readable device, carrier, or medium. For example, the computer-readable medium may include, but is not limited to, a magnetic storage device (for example, hard disk, floppy disk or tape, etc.), an optical disk (for example, compact disc (CD), digital versatile disc (DVD) etc.), a smart card and a flash memory device (for example, erasable programmable read-only memory (EPROM), card, stick or key drive, etc.). In addition, various storage media described herein may represent one or more devices and/or other machine-readable media for storing information. The term "machine-readable medium" may include, but is not limited to, a wireless channel and various other media capable of storing, containing, and/or carrying instructions and/or data.

FIG. 1 is a schematic diagram of a communication system in the present application. The communication system in FIG. 1 may include at least one terminal (such as terminal 1, terminal 2) and a network device. The network device is configured to provide a communication service for the terminal and access a core network. The terminal can access the network by searching for a synchronization signal, a broadcast signal, etc. transmitted by the network device, so as to communicate with the network. Terminal 1 in FIG. 1 establishes a link 1 with the network device, and terminal 1 can perform uplink and downlink transmissions with the network device. For example, the network device may transmit a downlink signal to terminal 1, and may also receive an uplink signal transmitted by terminal 1.

In addition, the communication system in FIG. 1 may also include a relay device. The network device can provide a communication service for the relay device and access the core network. The relay device can access the network by searching for a synchronization signal, a broadcast signal, etc. transmitted by the network device, so as to realize network communication. The relay device in FIG. 1 establishes link 2 with the network device, and the relay device may transmit a downlink signal to a relay device, and may also receive an uplink signal transmitted by a relay device. In this case, the relay device can be regarded as a kind of terminal with respect to the network device.

In addition, the terminal and the relay device can also be regarded as a communication system. The relay device in FIG. 1 establishes a link 3 with terminal 2. The relay device may transmit a downlink signal to terminal 2 and may also receive an uplink signal transmitted by terminal 2. In this case, the relay device can be regarded as a kind of network device with respect to the terminal.

It should be understood that the communication system may include one or more network devices. One network device can transmit data or control signaling to one or more terminals. Multiple network devices can also transmit data or control signaling to one or more terminals at the same time.

Currently, the physical layer may indicate a Hybrid Automatic Repeat reQuest-acknowledgement (HARQ-ACK) feedback configuration codebook in the following manners. 1. Downlink control information (DCI) format: services are differentiated through different DCI formats. For example, when scheduling signaling adopts DCI format 0_0/0_1/1_1/ 1_0 (where 0_0/0_1/1_1/1_0 are DCI format IDs), it indicates that a service type of scheduled data is enhanced mobile broadband (eMBB). When the scheduling signaling adopts DCI format 0_2/1_2, it indicates that the service type of the scheduled data is ultra-reliable low latency communication (URLLC). 2. Radio network temporary identifier (RNTI): services are differentiated through scrambling codes for DCI CRC scrambling. For example, when DCI CRC is scrambled by C-RNTI, it indicates that a service type of DCI scheduled data is eMBB. When DCI CRC is scrambled by MCS-C-RNTI, it indicates that the service type of the DCI scheduled data is URLLC. 3. New field/ existing field in DCI: a field is added in DCI payload to indicate the service type. For example, one bit is added in DCI payload. When the bit is 0, it indicates that the service type of scheduled data is eMBB. When the bit is 1, it indicates that the service type of the scheduled data is URLLC. 4. CORESET/search space: the service type is determined by a resource set (CORESET)/search space (Searchspace) where detected DCI is located. For example, when the DCI is detected in a CORESET1/Searchspace1 region, it indicates that a service type of DCI scheduled data is eMBB. When the DCI is detected in a CORESET2/ Searchspace2 region, it indicates that the service type of the DCI scheduled data is URLLC.

Currently, in DCI format 1_1, a field(s) related to uplink control information (UCI) is as follows.

Downlink assignment index—number of bits as defined in the following
- 4 bits if more than one serving cell are configured in the DL and the higher layer parameter pdsch-HARQ-ACK-Codebook=dynamic, where the 2 MSB bits are the counter DAI and the 2 LSB bits are the total DAI;
- 2 bits if only one serving cell is configured in the DL and the higher layer parameter pdsch-HARQ-ACK-Codebook=dynamic, where the 2 bits are the counter DAI;
- 0 bits otherwise.

TPC command for scheduled PUCCH—2 bits as defined in Subclause 7.2.1 of [5, TS 38.213]

PUCCH resource indicator—3 bits as defined in Subclause 9.2.3 of [5, TS 38.213]

PDSCH-to-HARQ_feedback timing indicator—0, 1, 2, or 3 bits as defined in Subclause 9.2.3 of [5, TS 38.213]. The bitwidth for this field is determined as $\lceil \log_2(L) \rceil$ bits, where I is the number of entries in the higher layer parameter dl-DataToUL-ACK At present, the field related to UCI in DCI format 1_1 is only suitable for one HARQ-ACK feedback configuration. Two HARQ-ACK feedback configurations are introduced in Release 16 (Rel-16). When the HARQ-ACK feedback configurations are differentiated by the RNTI, DCI field, and CORESET/Search space, the current design of UCI field in DCI format 1_1 (which has only one UCI field and the UCI field is determined based on one HARQ-ACK feedback configuration) cannot support two HARQ-ACK feedback configurations. The HARQ-ACK feedback configuration may include at least one of a HARQ-ACK codebook configuration or a PUCCH configuration. Based on a current protocol, an adaptive method may be adding two UCI fields in DCI format 1_1, with each UCI field corresponding to one of the two HARQ-ACK feedback configurations. However, in this way, an overhead of DCI format 1_1 may be significantly increased.

To this end, implementations of the present application provide methods for determining a UCI field and related apparatuses. The implementations of the present application will be described in detail below in conjunction with the drawings.

Figure 2A:
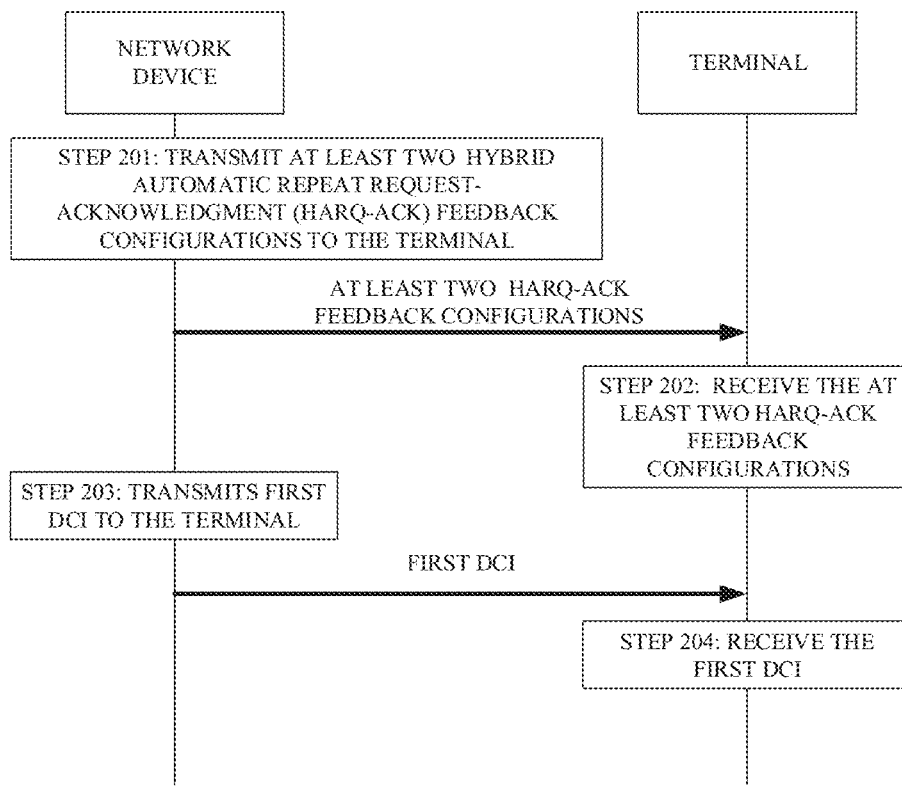
FIG. 2A is a schematic flowchart of a method for determining an uplink control information (UCI) field provided in implementations of the present application.

Referring to FIG. 2A, FIG. 2A is a schematic flowchart of a method for determining a UCI field in implementations of the present application. As illustrated in FIG. 2A, the method for determining a UCI field includes the following.

At step 201, a network device transmits at least two HARQ-ACK feedback configurations to a terminal.

At step 202, the terminal receives the at least two HARQ-ACK feedback configurations.

At step 203, the network device transmits first DCI to the terminal.

At step 204. The terminal receives the first DCI.

A first information field in the first DCI has a length determined by the at least two HARQ-ACK feedback configurations. The first information field is a field related to uplink control feedback in the first DCI. The length of the first information field may be measured and represented by the number of bits.

In a specific implementation, the terminal will receive the at least two HARQ-ACK feedback configurations and the first DCI transmitted by the network device. In the first DCI, the length of the first information field related to uplink control feedback is determined by the multiple HARQ-ACK feedback configurations received by the terminal. The information field related to uplink control feedback and determined in such manner is able to support any of multiple HARQ-ACK feedback configurations.

As can be seen, in the implementations of the present application, the network device first transmits at least two HARQ-ACK feedback configurations to the terminal, and the terminal receives the at least two HARQ-ACK feedback configurations. Then the network device transmits the first DCI to the terminal, and the terminal receives the first DCI. The length of the first information field related to uplink control feedback in the first DCI is determined by the at least two HARQ-ACK feedback configurations. Since the length of the first information field in the first DCI is determined by the multiple HARQ-ACK feedback configurations received by the terminal, the first information field is able to support any of the multiple HARQ-ACK feedback configurations. In this way, HARQ-ACK feedback configurations can be dynamically switched by one DCI, such that multiple HARQ-ACK feedback configurations can share one field related to uplink control feedback, which facilitates to reduce signaling overhead.

In a possible example, the first information field in the first DCI includes any of: a downlink assignment index (DAI) field, a physical uplink control channel resource indicator (PUCCH-resource-indicator) field, and a physical downlink share channel to HARQ feedback timing indicator (PDSCH-to-HARQ_feedback timing indicator) field.

The DAI field refers to the downlink assignment index field.

As can be seen, in this example, the field related to uplink control feedback in the first DCI may be any of the DAI field, the PUCCH-resource-indicator field, and the PDSCH-to-HARQ_feedback timing indicator field. In this way, for these three kinds of fields that relate to uplink control feedback, the terminal can determine the length of the field related to uplink control feedback in the first DCI according to the received at least two HARQ-ACK feedback configurations transmitted by the network device, such that these three kinds of fields related to uplink control feedback can support any of the multiple HARQ-ACK feedback configurations, which facilitates to reduce signaling overhead.

In a possible example, the length of the first information field in the first DCI is a maximum value of lengths of at least two reference first information fields, where the at least two reference first information fields are in one-to-one correspondence with the at least two HARQ-ACK feedback configurations.

For example, the terminal receives two different HARQ-ACK feedback configurations. Assuming that a reference first information field corresponding to a first HARQ-ACK feedback configuration received by the terminal has a length of 2, and a reference first information field corresponding to a second HARQ-ACK feedback configuration has a length of 3, then the length of the first information field related to uplink control feedback in the DCI is determined as 3.

As can be seen, in this example, since the length of the first information field related to uplink control feedback in the first DCI is a maximum value of lengths of at least two reference first information fields, where the at least two reference first information fields are in one-to-one correspondence with the at least two HARQ-ACK feedback configurations, the first information field related to uplink control feedback in the first DCI can support the at least two HARQ-ACK feedback configurations. In this way, HARQ-ACK feedback configurations can be dynamically switched by one DCI, such that multiple HARQ-ACK feedback configurations can share one field related to uplink control feedback, which facilitates to reduce signaling overhead.

In a possible example, first information of the terminal is used for indicating a target HARQ-ACK feedback configuration corresponding to the first DCI, where the target HARQ-ACK feedback configuration is one of the at least two HARQ-ACK feedback configurations.

In a specific implementation, the first information of the terminal indicates the HARQ-ACK feedback configuration corresponding to the first DCI received by the terminal. The HARQ-ACK feedback configuration corresponding to the first information of the terminal may be determined according to correspondence between different first information and different HARQ-ACK feedback configurations. The HARQ-ACK feedback configuration is any of the at least two HARQ-ACK feedback configurations received by the terminal.

As can be seen, in this example, the first information of the terminal indicates the target HARQ-ACK feedback configuration corresponding to the first DCI received by the terminal and transmitted by the network device. The target HARQ-ACK feedback configuration is one of the at least two HARQ-ACK feedback configurations received by the terminal. Since different first information indicates different corresponding HARQ-ACK feedback configurations, the corresponding target HARQ-ACK feedback configuration may be indicated by the first information received by the terminal, so that the length of the first information field related to uplink control feedback in the first DCI may be determined according to multiple HARQ-ACK feedback configurations indicated.

In a possible example, the first information includes any of: a radio network temporary identifier (RNTI), a DCI field, and a resource set (CORESET)/search space.

In a specific implementation, different HARQ-ACK feedback configurations should be differentiated. Different first information corresponds to different HARQ-ACK feedback configurations. Specifically, the multiple different HARQ-ACK feedback configurations may be differentiated by any of the RNTI, the DCI field, and the CORESET/search space.

As can be seen, in this example, after the terminal receives the at least two HARQ-ACK feedback configurations from the network device and determines the length of the first information field related to uplink control feedback in the first DCI according to the at least two HARQ-ACK feedback configurations, the at least two HARQ-ACK feedback configurations can be indicated by any of the RNTI, the DCI field, and the CORESET/search space, which facilitates to differentiate multiple different HARQ-ACK feedback configurations, so that it is more convenient to indicate a certain HARQ-ACK feedback configuration when needed.

In a possible example, the first information field includes a DAI field. If a PDSCH-HARQ-ACK-Codebook corresponding to the target HARQ-ACK feedback configuration is semi-static, information in the DAI field will not be parsed, or the information in the DAI field will be parsed into a meaning other than physical downlink share channel (PDSCH) allocation. If the PDSCH-HARQ-ACK-Codebook corresponding to the target HARQ-ACK feedback configuration is dynamic, the information in the DAI field will be parsed, and the information parsed is at least used for determining a HARQ-ACK mapping order in HARQ-ACK feedbacks.

For example, the first information field may be the DAI field. Some DAI includes two parts, where one part is used for determining the HARQ-ACK mapping order in HARQ-ACK feedbacks, and the other part is used for determining a total number of HARQ-ACKs. After the terminal receives the at least two HARQ-ACK feedback configurations and determines the length of the DAI related to uplink control feedback in the first DCI according to the at least two HARQ-ACK feedback configurations, the terminal indicates the target HARQ-ACK feedback configuration corresponding to the DCI according to the first information. If the PDSCH-HARQ-ACK-Codebook corresponding to the target HARQ-ACK feedback configuration is semi-static, the terminal will not parse the DAI field, or parse information in the DAI field into the meaning other than PDSCH allocation, such as the number of PSSCH receptions, which will not affect the HARQ-ACK mapping order in HARQ-ACK feedbacks. If the PDSCH-HARQ-ACK-Codebook corresponding to the target HARQ-ACK feedback configuration is dynamic, the terminal will parse the DAI field, and the information parsed is at least used for determining the HARQ-ACK mapping order in HARQ-ACK feedbacks.

As can be seen, in this example, after the terminal receives the at least two HARQ-ACK feedback configurations and determines the length of the DAI field related to uplink control feedback in the first DCI according to the at least two HARQ-ACK feedback configurations, the terminal indicates the target HARQ-ACK feedback configuration corresponding to the DCI according to the first information. In this way, parsing of the DAI field can be indicated according to the PDSCH-HARQ-ACK-Codebook configurations corresponding to different target HARQ-ACK feedback configurations, which is beneficial to improve flexibility of information indicating.

In a possible example, the first information field includes a PUCCH-resource-indicator field or a PDSCH-to-HARQ_feedback timing indicator field. If a target first information field corresponding to the target HARQ-ACK feedback configuration has a length equal to the first information field in the first DCI, all bits in the first information field in the first DCI are parsed. If the target first information field corresponding to the target HARQ-ACK feedback configuration has a length less than the first information field in the first DCI, x_A most significant bits or x_A least significant bits in the first information field in the first DCI are parsed, where x_A is the length of the target first information field corresponding to the target HARQ-ACK feedback configuration.

For example, the first information field may be the PUCCH-resource-indicator field or the PDSCH-to-HARQ_feedback timing indicator field. After the terminal receives the at least two HARQ-ACK feedback configurations and determines the length of the PUCCH-resource-indicator field or the PDSCH-to-HARQ_feedback timing indicator field related to uplink control feedback in the first DCI according to the at least two HARQ-ACK feedback configurations, the terminal indicates the target HARQ-ACK feedback configuration corresponding to the DCI according to the first information. If the length of the target PUCCH-resource-indicator field or the PDSCH-to-HARQ_feedback timing indicator field is 1, and the length of the PUCCH-resource-indicator field or the PDSCH-to-HARQ_feedback timing indicator field in the first DCI is 2, one most significant bit or one least significant bit in the PUCCH-resource-indicator field or the PDSCH-to-HARQ_feedback timing indicator field in the first DCI are parsed.

As can be seen, in this example, after the terminal receives the at least two HARQ-ACK feedback configurations and determines the length of the PUCCH-resource-indicator field or the PDSCH-to-HARQ_feedback timing indicator field related to uplink control feedback in the first DCI according to the at least two HARQ-ACK feedback configurations, the terminal indicates the target HARQ-ACK feedback configuration corresponding to the DCI according to the first information. In this way, parsing of the PUCCH-resource-indicator field or the PDSCH-to-HARQ_feedback timing indicator field can be indicated according to a relationship between the length of the target PUCCH-resource-indicator field or the target PDSCH-to-HARQ_feedback timing indicator field corresponding to the target HARQ-ACK feedback configuration and the length of the PUCCH-resource-indicator field or the PDSCH-to-HARQ_feedback timing indicator field related to uplink control feedback in the first DCI, which is beneficial to improve an accuracy of information indicating.

A detailed description will be given below in conjunction with specific examples.

Figure 2B:
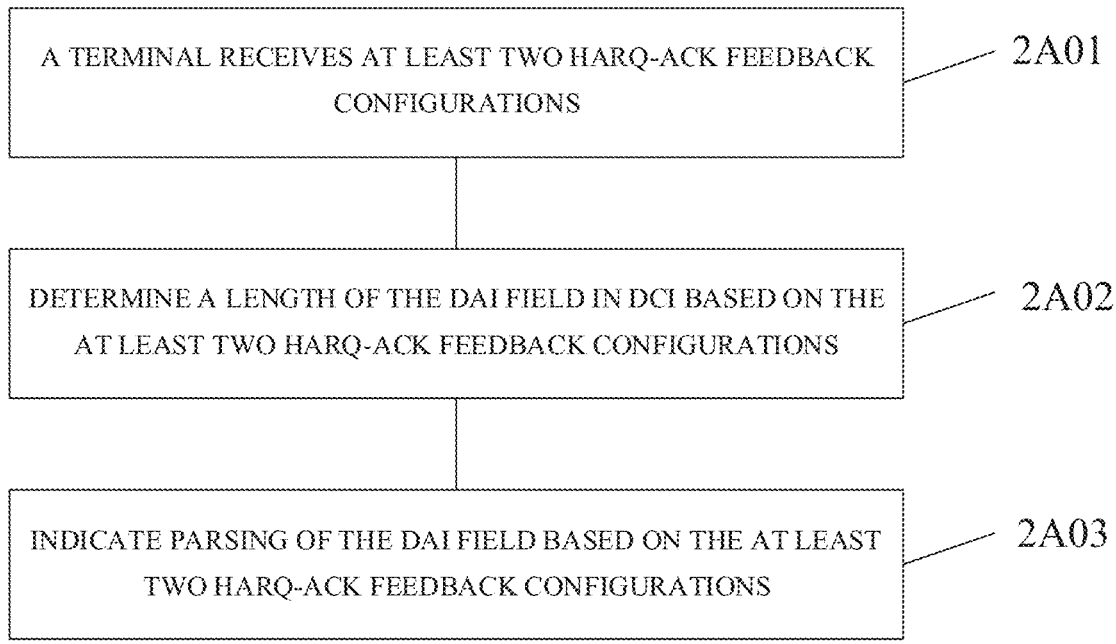
FIG. 2B is a schematic flowchart of another method for determining a UCI field provided in implementations of the present application.

Example 1, referring to FIG. 2B, FIG. 2B is a schematic flowchart of another method for determining a UCI field provided in implementations of the present application. In a case that the first information field is a DAI field, the method includes the following.

At step 2A01, a terminal receives at least two HARQ-ACK feedback configurations.

Specifically, the terminal receives a first pdsch-HARQ-ACK-Codebook configuration corresponding to a first HARQ-ACK codebook, and the terminal receives a second pdsch-HARQ-ACK-Codebook configuration corresponding to a second HARQ-ACK codebook. For example, the terminal receives the first HARQ-ACK feedback configuration, where the corresponding first pdsch-HARQ-ACK-Codebook=semi-static, and the terminal receives the second HARQ-ACK feedback configuration, where the corresponding second pdsch-HARQ-ACK-Codebook=dynamic.

At step 2A02, a length of the DAI field in DCI is determined based on the at least two HARQ-ACK feedback configurations. Specifically:

4 bits if more than one serving cell are configured in the DL and at least one of higher layer parameters pdsch-HARQ-ACK-Codebook=dynamic for, where the 2 MSB bits are the counter DAI and the 2 LSB bits are the total DAI;

2 bits if only one serving cell is configured in the DL and at least one of the higher layer parameters pdsch-HARQ-ACK-Codebook=dynamic, where the 2 bits are the counter DAI;

0 bits otherwise (all higher layer parameters pdsch-HARQ-ACK-Codebook=semi-static).

For example, if the terminal receives the first HARQ-ACK feedback configuration and the corresponding first pdsch-HARQ-ACK-Codebook configuration=semi-static, a first DAI field has 0 bit. If the terminal receives the second HARQ-ACK feedback configuration and the corresponding second pdsch-HARQ-ACK-Codebook configuration=dynamic, and the terminal is configured with four serving cells, a second DAI field has 4 bits. The first DAI field and the second DAI field are used as reference DAI fields. The length of the DAI field in the first DCI can be determined as max{0,4}=4 according to the reference DAI fields.

At step 2A03, parsing of the DAI field is indicated based on the at least two HARQ-ACK feedback configurations.

Specifically, the terminal receives a physical downlink control channel (PDCCH), and is indicated to parse or not parse the DAI field based on the HARQ-ACK feedback configurations. Specifically, the HARQ-ACK feedback configurations can be differentiated by at least one of an RNTI, a DCI field, or a CORESET/Search space. For example, the terminal determines a first HARQ-ACK feedback configuration corresponding to current DCI by at least one of RNTI/DCI field/CORESET/Search space. If the first PDSCH-HARQ-ACK-Codebook corresponding to the first HARQ-ACK feedback configuration is semi-static, the terminal will not parse the DAI field, or parse the DAI field into other meanings, such as the number of PDSCH receptions, which will not affect a HARQ-ACK mapping order in the HARQ-ACK feedbacks. The terminal determines a second HARQ-ACK feedback configuration corresponding to the current DCI by the RNTI/DCI field/CORESET/Search space. If the second PDSCH-HARQ-ACK-Codebook corresponding to the second HARQ-ACK feedback configuration is dynamic, the terminal will parse the DAI field for determining the HARQ-ACK mapping order in the HARQ-ACK feedbacks.

As can be seen, in this example, the terminal receives at least two HARQ-ACK feedback configurations and determines the length of the DAI field in the first DCI according to the at least two HARQ-ACK feedback configurations. Since two reference DAI fields and the at least two HARQ-ACK feedback configurations received by the terminal are in one-to-one correspondence, the length of the DAI field in the first DCI is determined by the at least two HARQ-ACK feedback configurations. In this way, HARQ-ACK feedback configurations can be dynamically switched by one DCI, so that multiple HARQ-ACK feedback configurations can share one DAI field, which is beneficial to reduce signaling overhead and improve flexibility of information indicating.

Figure 2C:
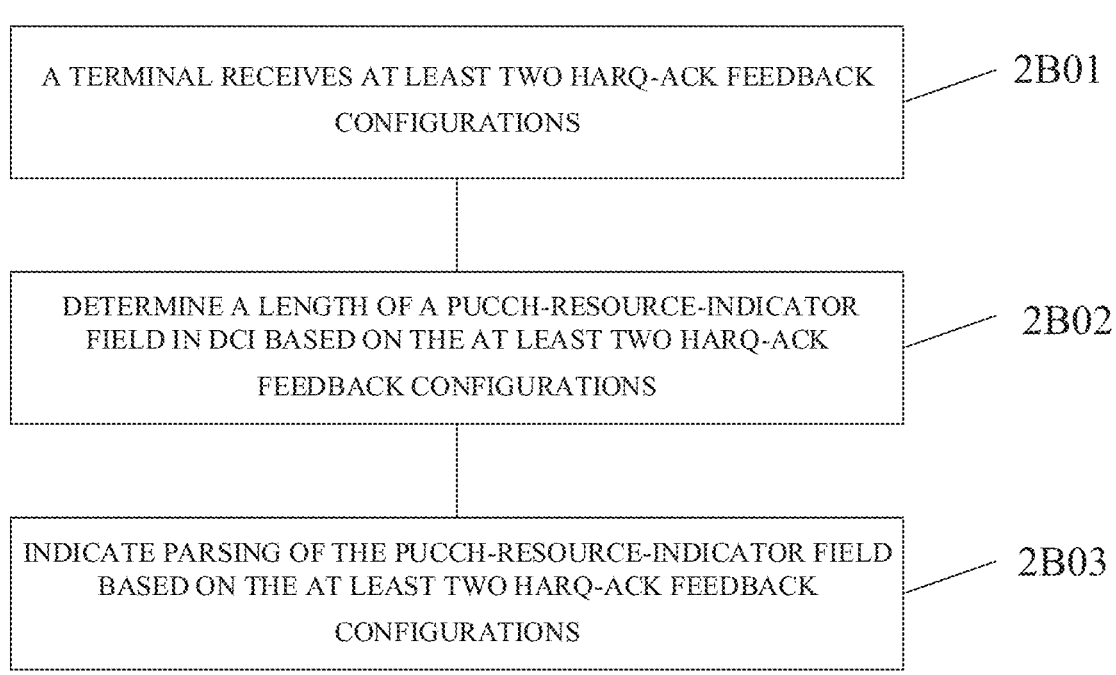
FIG. 2C is a schematic flowchart of another method for determining a UCI field provided in implementations of the present application.

Example 2, referring to FIG. 2C, FIG. 2C is a schematic flowchart of another method for determining a UCI field provided in implementations of the present application. In a case that the first information field is a PUCCH-resource-indicator field, the method includes the following.

At step 2B01, a terminal receives at least two HARQ-ACK feedback configurations.

Specifically, the terminal receives a first physical uplink control channel (PUCCH) configuration corresponding to a first HARQ-ACK feedback configuration, where the first PUCCH configuration includes length information of a first PUCCH-resource-indicator field (directly configured or indirectly configured by the number of PUCCH resources). The terminal receives a second PUCCH configuration corresponding to a second HARQ-ACK feedback configuration, where the second PUCCH configuration includes length information of a second PUCCH-resource-indicator field (directly configured or indirectly configured by the number of PUCCH resources). For example, the first PUCCH-resource-indicator field corresponding to the first HARQ-ACK feedback configuration received by the terminal has a length of 3, and the second PUCCH-resource-indicator field corresponding to the second HARQ-ACK feedback configuration received by the terminal has a length of 4.

At step 2B02, a length of a PUCCH-resource-indicator field in DCI is determined based on the at least two HARQ-ACK feedback configurations. Specifically:

X bits, X=maximum {x_A, x_B}, where x_A corresponds to the length of the first PUCCH-resource-indicator field and x_B corresponds the length of the second PUCCH-resource-indicator field. If the second PUCCH configuration is not configured, the length of the second PUCCH-resource-indicator field is regarded as 0.

For example, the length of the first PUCCH-resource-indicator field corresponding to the first HARQ-ACK feedback configuration received by the terminal is 3, and the length of the second PUCCH-resource-indicator field corresponding to the second HARQ-ACK feedback configuration received by the terminal is 4. The first PUCCH-resource-indicator field and the second PUCCH-resource-indicator field are used as reference fields. Then the length of the PUCCH-resource-indicator field in the first DCI is determined as max{3, 4}=4 according to the reference fields.

At step 2B03, parsing of the PUCCH-resource-indicator field is indicated based on the at least two HARQ-ACK feedback configurations.

Specifically, the terminal receives a PDCCH, and is indicated to parse the PUCCH-resource-indicator field based on the HARQ-ACK feedback configurations. Specifically, the HARQ-ACK feedback configurations may be differentiated by at least one of an RNTI, a DCI field, or a CORESET/Search space. The terminal determines the first HARQ-ACK feedback configuration corresponding to current DCI by the RNTI/DCI field/CORESET/Search space, and parses the PUCCH-resource-indicator field according to the length of the first PUCCH-resource-indicator field corresponding to the first HARQ-ACK feedback configuration. When the length of the first PUCCH-resource-indicator field is the same as the length the PUCCH-resource-indicator field, all bits in the PUCCH-resource-indicator field are parsed. When the length of the first PUCCH-resource-indicator field is less than the length the PUCCH-resource-indicator field, x_A most significant bits or x_A least significant bits in the PUCCH-resource-indicator field are parsed. The second HARQ-ACK feedback configuration may be parsed in a same manner as above.

For example, the terminal determines previously that the length of the PUCCH-resource-indicator field is 4. The terminal determines the first HARQ-ACK feedback configuration corresponding to the current DCI by the RNTI/DCI field/CORESET/Search space, and determines the length of the corresponding first PUCCH-resource-indicator field as 3 according to the first HARQ-ACK feedback configuration, so the terminal parses 3 least significant bits in the PUCCH-resource-indicator field to determine a PUCCH resource.

As can be seen, in this example, the terminal receives the at least two HARQ-ACK feedback configurations, and determines the length of the PUCCH-resource-indicator field in the first DCI according to the at least two HARQ-ACK feedback configurations. Since two reference PUCCH-resource-indicator fields and the at least two HARQ-ACK feedback configurations received by the terminal are in one-to-one correspondence, the length of the PUCCH-resource-indicator field in the first DCI is determined by the at least two HARQ-ACK feedback configurations. In this way, HARQ-ACK feedback configurations can be dynamically switched by one DCI, so that multiple HARQ-ACK feedback configurations can share one PUCCH-resource-indicator field, which is beneficial to reduce signaling overhead and improve an accuracy of information indicating.

Figure 2D:
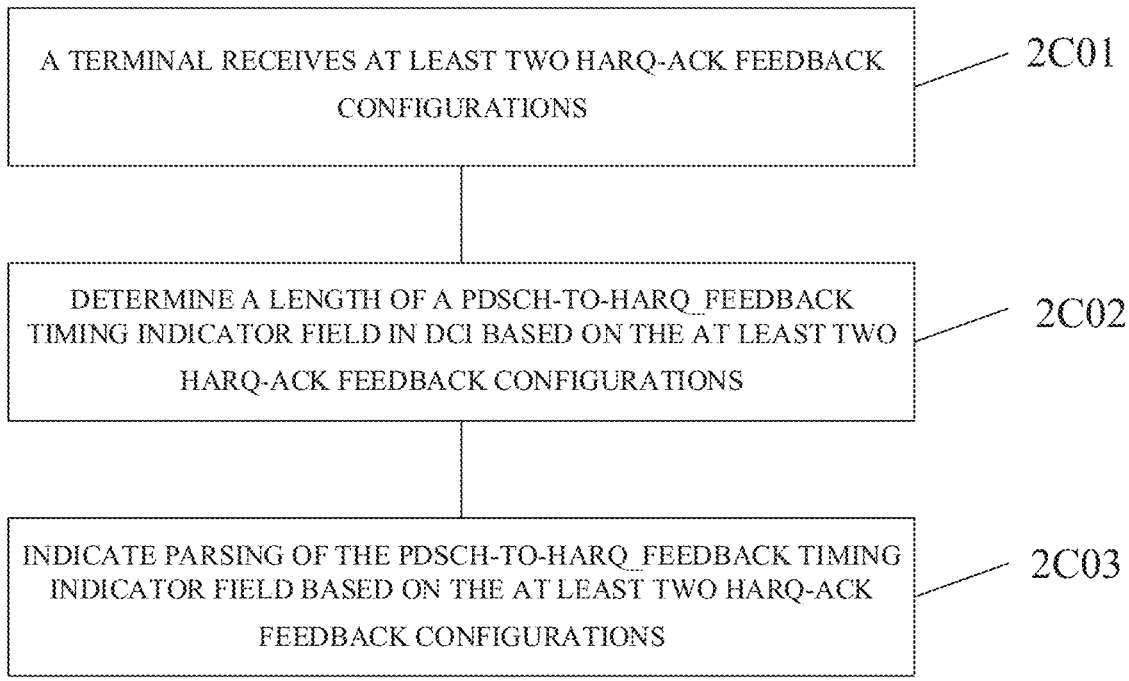
FIG. 2D is a schematic flowchart of another method for determining a UCI field provided in implementations of the present application.

Example 3, referring to FIG. 2D, FIG. 2D is a schematic flowchart of another method for determining a UCI field provided in implementations of the present application. In a case that the first information field is a PDSCH-to-HARQ_feedback timing indicator field, the method includes the following.

At step 2C01, a terminal receives at least two HARQ-ACK feedback configurations.

Specifically, the terminal receives a first PUCCH configuration corresponding to a first HARQ-ACK feedback configuration, where the first PUCCH configuration includes length information of a first PDSCH-to-HARQ_feedback timing indicator field (directly configured or indirectly configured by the number of dl-DataToUL-ACKs). The terminal receives a second PUCCH configuration corresponding to a second HARQ-ACK feedback configuration, where the second PUCCH configuration includes length information of a second PDSCH-to-HARQ_feedback timing indicator field (directly configured or indirectly configured by the number of dl-DataToUL-ACKs). For example, the first PDSCH-to-HARQ_feedback timing indicator field corresponding to the first HARQ-ACK feedback configuration received by the terminal has a length of 3, and the second PDSCH-to-HARQ_feedback timing indicator field corresponding to the second HARQ-ACK feedback configuration received by the terminal has a length of 4.

At step 2C02, a length of a PDSCH-to-HARQ_feedback timing indicator field in DCI is determined based on the at least two HARQ-ACK feedback configurations.

The specific description for this step is consistent with the corresponding part in the above example 2, except that the PUCCH-resource-indicator field differs from the PDSCH-to-HARQ_feedback timing indicator field, which will not be repeated herein.

At step 2C03, parsing of the PDSCH-to-HARQ_feedback timing indicator field is indicated based on the at least two HARQ-ACK feedback configurations.

Specifically, the terminal receives a PDCCH, and is indicated to parse the PDSCH-to-HARQ_feedback timing indicator field according to the HARQ-ACK feedback configurations. The specific description for this step is consistent with the corresponding part in the above example 2, except that the PUCCH-resource-indicator field differs from the PDSCH-to-HARQ_feedback timing indicator field, which will not be repeated herein.

As can be seen, in this example, the terminal receives the at least two HARQ-ACK feedback configurations, and determines the length of the PDSCH-to-HARQ_feedback timing indicator field in the first DCI according to the at least two HARQ-ACK feedback configurations. Since two reference fields and the at least two HARQ-ACK feedback configurations received by the terminal are in one-to-one correspondence, the length of the PDSCH-to-HARQ_feedback timing indicator field in the first DCI is determined by the at least two HARQ-ACK feedback configurations. In this way, HARQ-ACK feedback configurations can be dynamically switched by one DCI, so that multiple HARQ-ACK feedback configurations can share one PDSCH-to-HARQ_feedback timing indicator field, which is beneficial to reduce signaling overhead and improve an accuracy of information indicating.

Figure 3:
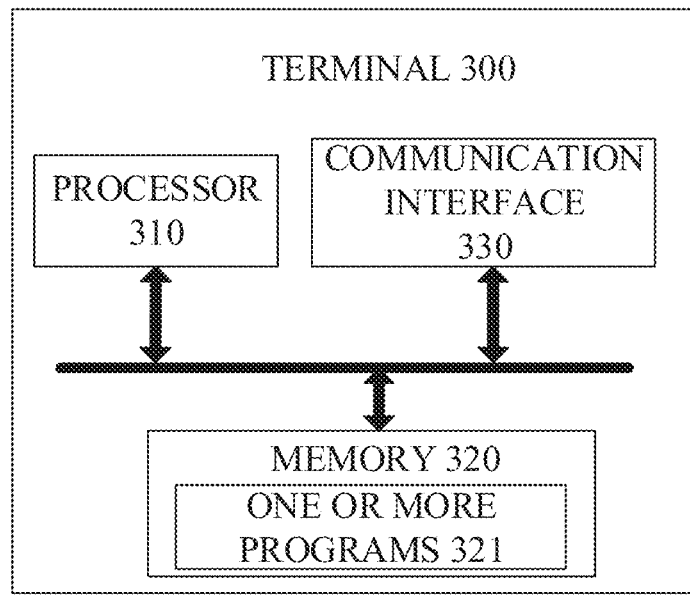
FIG. 3 is a schematic structural diagram of a terminal provided in implementations of the present application.

In consistence with the implementation illustrated in FIG. 2A, referring to FIG. 3, FIG. 3 is a schematic structural diagram of a terminal 300 provided in implementations of the present application. As illustrated in FIG. 3, the terminal 300 includes a processor 310, a memory 320, a communication interface 330, and one or more programs 321. The one or more programs 321 are stored in the memory 320 and configured to be executed by the processor 310. The one or more programs 321 include instructions for carrying out the following operations.

A terminal receives at least two HARQ-ACK feedback configurations. The terminal receives first DCI, where a first information field in the first DCI has a length determined by the at least two HARQ-ACK feedback configurations, and the first information field is a field related to uplink control feedback in the first DCI.

As can be seen, in the implementations of the present application, the terminal first receives at least two HARQ-ACK feedback configurations transmitted by a network device, and then receives the first DCI transmitted by the network device. The length of the first information field related to uplink control feedback in the first DCI is determined by the at least two HARQ-ACK feedback configurations. Since the length of the first information field in the first DCI is determined by the multiple HARQ-ACK feedback configurations received by the terminal, the first information field is able to support any of the multiple HARQ-ACK feedback configurations. In this way, HARQ-ACK feedback configurations can be dynamically switched by one DCI, such that multiple HARQ-ACK feedback configurations can share one field related to uplink control feedback, which facilitates to reduce signaling overhead.

In a possible example, the first information field in the first DCI includes any of: a DAI field, a PUCCH-resource-indicator field, and a PDSCH-to-HARQ_feedback timing indicator field.

In a possible example, the length of the first information field in the first DCI is a maximum value of lengths of at least two reference first information fields, where the at least two reference first information fields are in one-to-one correspondence with the at least two HARQ-ACK feedback configurations.

In a possible example, first information of the terminal is used for indicating a target HARQ-ACK feedback configuration corresponding to the first DCI, where the target HARQ-ACK feedback configuration is one of the at least two HARQ-ACK feedback configurations.

In a possible example, the first information includes any of: an RNTI, a DCI field, and a CORESET/search space.

In a possible example, the first information field includes a DAI field. If a PDSCH-HARQ-ACK-Codebook corresponding to the target HARQ-ACK feedback configuration is semi-static, parsing of information in the DAI field is skipped, or the information in the DAI field will be parsed into a meaning other than PDSCH allocation. If the PDSCH-HARQ-ACK-Codebook corresponding to the target HARQ-ACK feedback configuration is dynamic, the information in the DAI field will be parsed, and the information parsed is at least used for determining a HARQ-ACK mapping order in HARQ-ACK feedbacks In a possible example, the first information field includes a PUCCH-resource-indicator field or a PDSCH-to-HARQ_feedback timing indicator field. If a target first information field corresponding to the target HARQ-ACK feedback configuration has a length equal to the first information field in the first DCI, all bits in the first information field in the first DCI are parsed. If the target first information field corresponding to the target HARQ-ACK feedback configuration has a length less than the first information field in the first DCI, x_A most significant bits or x_A least significant bits in the first information field in the first DCI are parsed, where x_A is the length of the target first information field corresponding to the target HARQ-ACK feedback configuration.

Figure 4:
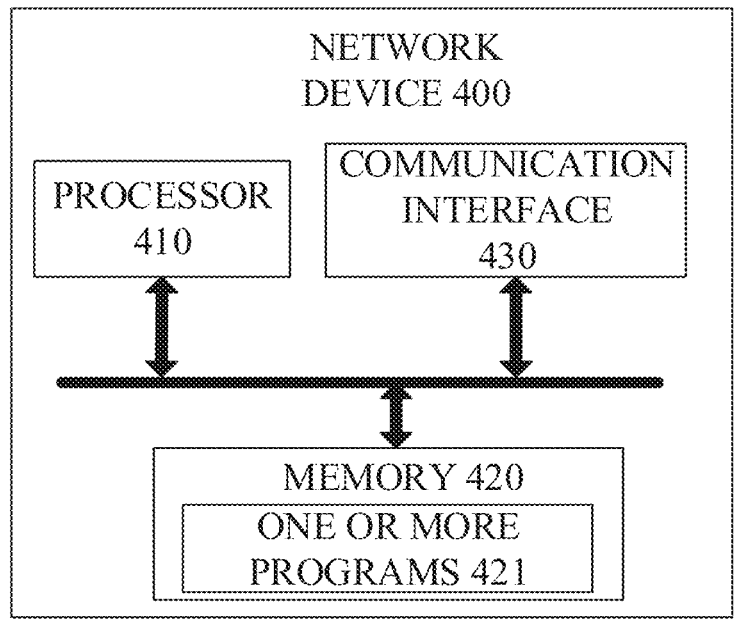
FIG. 4 is schematic structural diagram of a network device provided in implementations of the present application.

Referring to FIG. 4, FIG. 4 is schematic structural diagram of a network device 400 provided in implementations of the present application. As illustrated in FIG. 4, the network device 400 includes a processor 410, a memory 420, a communication interface 430, and one or more programs 421. The one or more programs 421 are stored in the memory 420 and configured to be executed by the processor 410. The one or more programs 421 include instructions for carrying out the following operations.

A network device transmits at least two HARQ-ACK feedback configurations to a terminal. The network device transmits first DCI to the terminal, where a first information field in the first DCI has a length determined by the at least two HARQ-ACK feedback configurations, and the first information field is a field related to uplink control feedback in the first DCI.

As can be seen, in the implementations of the present application, the network device first transmits at least two HARQ-ACK feedback configurations to the terminal, and then transmits the first DCI to the terminal. The length of the first information field related to uplink control feedback in the first DCI is determined by the at least two HARQ-ACK feedback configurations. Since the length of the first information field in the first DCI is determined by the multiple HARQ-ACK feedback configurations received by the terminal, the first information field is able to support any of the multiple HARQ-ACK feedback configurations. In this way, HARQ-ACK feedback configurations can be switched dynamically by one DCI, such that multiple HARQ-ACK feedback configurations can share one field related to uplink control feedback, which facilitates to reduce signaling overhead.

In a possible example, the first information field in the first DCI includes any of: a DAI field, a PUCCH-resource-indicator field, and a PDSCH-to-HARQ_feedback timing indicator field.

In a possible example, the length of the first information field in the first DCI is a maximum value of lengths of at least two reference first information fields, where the at least two reference first information fields are in one-to-one correspondence with the at least two HARQ-ACK feedback configurations.

In a possible example, first information of the terminal is used for indicating a target HARQ-ACK feedback configuration corresponding to the first DCI, where the target HARQ-ACK feedback configuration is one of the at least two HARQ-ACK feedback configurations.

In a possible example, the first information includes any of: an RNTI, a DCI field, and a CORESET/search space.

In a possible example, the first information field includes a DAI field. If a PDSCH-HARQ-ACK-Codebook corresponding to the target HARQ-ACK feedback configuration is semi-static, information in the DAI field will not be parsed, or the information in the DAI field will be parsed into a meaning other than PDSCH allocation. If the PDSCH-HARQ-ACK-Codebook corresponding to the target HARQ-ACK feedback configuration is dynamic, the information in the DAI field will be parsed, and the information parsed is at least used for determining a HARQ-ACK mapping order in HARQ-ACK feedbacks.

In a possible example, the first information field includes a PUCCH-resource-indicator field or a PDSCH-to-HARQ_feedback timing indicator field. If a target first information field corresponding to the target HARQ-ACK feedback configuration has a length equal to the first information field in the first DCI, all bits in the first information field in the first DCI are parsed. If the target first information field corresponding to the target HARQ-ACK feedback configuration has a length less than the first information field in the first DCI, x_A most significant bits or x_A least significant bits in the first information field in the first DCI are parsed, where x_A is the length of the target first information field corresponding to the target HARQ-ACK feedback configuration.

The solution in the implementations of the present application are explained above from the perspective of interaction between various network elements. It can be understood that, in order to implement the above-mentioned functions, the terminal includes corresponding hardware structures and/or software modules for performing respective functions. Those skilled in the art should easily realize that in combination with units and algorithm steps of the examples described in the implementations disclosed herein, the present application can be implemented by hardware or a combination of hardware and computer software. Whether a certain function is executed by hardware or computer software-driven hardware depends on the specific application and design constraint conditions of the technical solution. Professionals and technicians can use different methods for each specific application to implement the described functions, but such implementation should not be considered beyond the scope of this application.

The implementations of the present application may divide the terminal into functional units according to the foregoing method examples. For example, each functional unit may be divided corresponding to each function, or two or more functions may be integrated into one processing unit. The above-mentioned integrated unit can be realized in the form of hardware or software program module. It should be noted that the division of units in the implementations of the present application is illustrative, and is only a logical functional division, and there may be other division methods in actual implementation.

Figure 5:
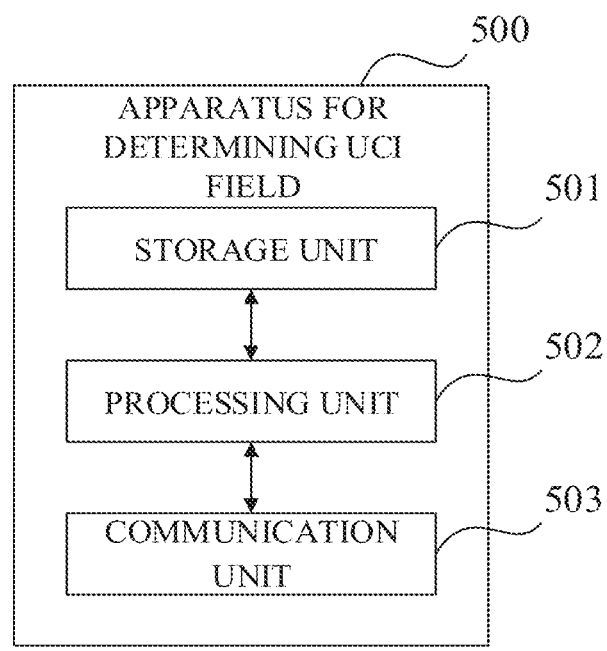
FIG. 5 is a block diagram of functional units of an apparatus for determining a UCI field provided in implementations of the present application.

In case that the integrated unit is adopted, FIG. 5 is a block diagram of functional units of an apparatus for determining a UCI field provided in implementations of the present application. The apparatus 500 for determining a UCI field is applied to a terminal and includes specifically a processing unit 502 and a communication unit 503. The processing unit 502 is configured to control and manage actions of the terminal. For example, the processing unit 502 is configured to support the terminal to perform steps 202 and 204 in FIG. 2A and/or other processes used in the technology described herein. The communication unit 503 is configured to support communication between the terminal and other devices. The apparatus for determining a UCI field may further includes a storage unit 501 configured to store program codes and data of the terminal.

The processing unit 502 may be a processor or a controller, for example, a central processing unit (CPU), a general-purpose processor, a digital signal processor (DSP), an application-specific integrated circuit (ASIC), a field programmable gate array (FPGA) or other programmable logic devices, transistor logic devices, hardware components or any combination thereof. The processing unit 502 may implement or execute various exemplary logical blocks, modules, and circuits described in conjunction with the disclosure of this application. The processor may also be a combination for realizing computing functions, for example, including a combination of one or more microprocessors, a combination of a DSP and a microprocessor, etc. The communication unit 503 may be a communication interface, a transceiver, a transceiver circuit, etc., and the storage unit 501 may be a memory. When the processing unit 502 is a processor, the communication unit 503 is a communication interface, and the storage unit 501 is a memory, the terminal involved in the implementations of the present application may be the terminal illustrated in FIG. 3.

In a specific implementation, the processing unit 502 is configured to perform any step performed by the terminal in the foregoing method implementations, and when performing data transmission such as transmitting, the communication unit 503 can be optionally invoked to complete the corresponding operation. The detailed description is given below.

The processing unit 502 is configured to receive at least two HARQ-ACK feedback configurations by the communication unit 503, and receive first DCI by the communication unit, where a first information field in the first DCI has a length determined by the at least two HARQ-ACK feedback configurations, and the first information field is a field related to uplink control feedback in the first DCI.

As can be seen, in the implementations of the present application, the terminal first receives at least two HARQ-ACK feedback configurations transmitted by a network device, and then receives the first DCI transmitted by the network device. The length of the first information field in the first DCI is determined by the at least two HARQ-ACK feedback configurations, where the first information field is related to uplink control feedback. Since the length of the first information field in the first DCI is determined by the multiple HARQ-ACK feedback configurations received by the terminal, the first information field is able to support any of the multiple HARQ-ACK feedback configurations. In this way, HARQ-ACK feedback configurations can be dynamically switched by one DCI, such that multiple HARQ-ACK feedback configurations can share one field related to uplink control feedback, which facilitates to reduce signaling overhead.

In a possible example, the first information field in the first DCI includes any of: a DAI field, a PUCCH-resource-indicator field, and a PDSCH-to-HARQ_feedback timing indicator field.

In a possible example, the length of the first information field in the first DCI is a maximum value of lengths of at least two reference first information fields, where the at least two reference first information fields are in one-to-one correspondence with the at least two HARQ-ACK feedback configurations.

In a possible example, first information of the terminal is used for indicating a target HARQ-ACK feedback configuration corresponding to the first DCI, where the target HARQ-ACK feedback configuration is one of the at least two HARQ-ACK feedback configurations.

In a possible example, the first information includes any of: an RNTI, a DCI field, and a CORESET/search space.

In a possible example, the first information field includes a DAI field. If a PDSCH-HARQ-ACK-Codebook corresponding to the target HARQ-ACK feedback configuration is semi-static, information in the DAI field will not be parsed, or the information in the DAI field will be parsed into a meaning other than PDSCH allocation. If the PDSCH-HARQ-ACK-Codebook corresponding to the target HARQ-ACK feedback configuration is dynamic, the information in the DAI field will be parsed, and the information parsed is at least used for determining a HARQ-ACK mapping order in HARQ-ACK feedbacks.

In a possible example, the first information field includes a PUCCH-resource-indicator field or a PDSCH-to-HARQ_feedback timing indicator field. If a target first information field corresponding to the target HARQ-ACK feedback configuration has a length equal to the first information field in the first DCI, all bits in the first information field in the first DCI are parsed. If the target first information field corresponding to the target HARQ-ACK feedback configuration has a length less than the first information field in the first DCI, x_A most significant bits or x_A least significant bits in the first information field in the first DCI are parsed, where x_A is the length of the target first information field corresponding to the target HARQ-ACK feedback configuration.

Figure 6:
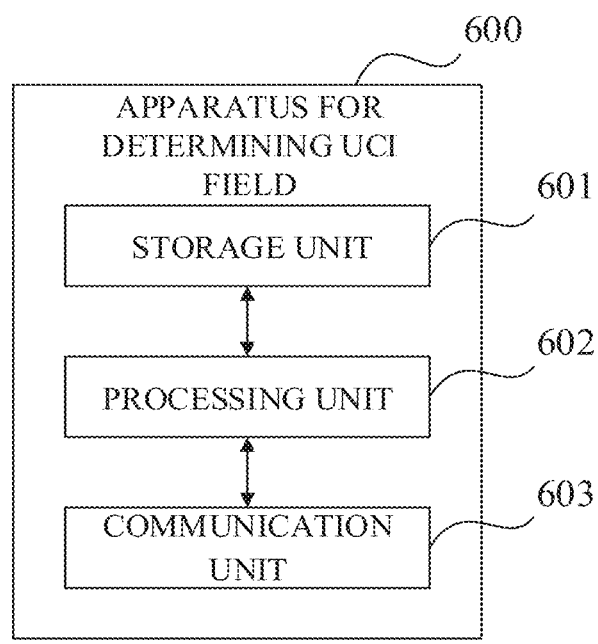
FIG. 6 is a block diagram of functional units of another apparatus for determining a UCI field provided in implementations of the present application.

In case that the integrated unit is adopted, FIG. 6 is a block diagram of functional units of an apparatus for determining a UCI field provided in implementations of the present application. The apparatus 600 for determining a UCI field is applied to a network device, and the network device includes a processing unit 602 and a communication unit 603. The processing unit 602 is configured to control and manage actions of the network device. For example, the processing unit 602 is configured to support the network device to perform steps 201 and 203 in FIG. 2A and/or other processes used in the technology described herein. The communication unit 603 is configured to support communication between the network device and other devices. The network device may further includes a storage unit 601 configured to store program codes and data of the terminal.

The processing unit 602 may be a processor or a controller, for example, a CPU, a general-purpose processor, a DSP, an ASIC, an FPGA or other programmable logic devices, transistor logic devices, hardware components or any combination thereof. The processing unit 602 may implement or execute various exemplary logical blocks, modules, and circuits described in conjunction with the disclosure of this application. The processor may also be a combination for realizing computing functions, for example, including a combination of one or more microprocessors, a combination of a DSP and a microprocessor, and so on. The communication unit 603 may be a communication interface, a transceiver, a transceiver circuit, etc., and the storage unit 601 may be a memory. When the processing unit 602 is a processor, the communication unit 603 is a communication interface, and the storage unit 601 is a memory, the network device involved in the implementations of the present application may be the network device illustrated in FIG. 4.

In a specific implementation, the processing unit 602 is configured to perform any step performed by the network device in the foregoing method implementations, and when performing data transmission such as transmitting, the communication unit 603 can be optionally invoked to complete the corresponding operation. The detailed description is given below.

The processing unit 602 is configured to transmit at least two HARQ-ACK feedback configurations to a terminal by the communication unit 603, and transmit first DCI to the terminal by the communication unit 603, where a first information field in the first DCI has a length determined by the at least two HARQ-ACK feedback configurations, and the first information field is a field related to uplink control feedback in the first DCI.

As can be seen, in the implementations of the present application, the network device first transmits at least two HARQ-ACK feedback configurations to the terminal, and then transmits the first DCI to the terminal. The length of the first information field in the first DCI is determined by the at least two HARQ-ACK feedback configurations, where the first information field is related to uplink control feedback. Since the length of the first information field in the first DCI is determined by the multiple HARQ-ACK feedback configurations received by the terminal, the first information field is able to support any of the multiple HARQ-ACK feedback configurations. In this way, HARQ-ACK feedback configurations can be switched dynamically by one DCI, such that multiple HARQ-ACK feedback configurations can share one field related to uplink control feedback, which facilitates to reduce signaling overhead.

In a possible example, the first information field in the first DCI includes any of: a DAI field, a PUCCH-resource-indicator field, and a PDSCH-to-HARQ_feedback timing indicator field.

In a possible example, the length of the first information field in the first DCI is a maximum value of lengths of at least two reference first information fields, where the at least two reference first information fields are in one-to-one correspondence with the at least two HARQ-ACK feedback configurations.

In a possible example, first information of the terminal is used for indicating a target HARQ-ACK feedback configuration corresponding to the first DCI, where the target HARQ-ACK feedback configuration is one of the at least two HARQ-ACK feedback configurations.

In a possible example, the first information includes any of: an RNTI, a DCI field, and a CORESET/search space.

In a possible example, the first information field includes a DAI field. If a PDSCH-HARQ-ACK-Codebook corresponding to the target HARQ-ACK feedback configuration is semi-static, information in the DAI field will not be parsed, or the information in the DAI field will be parsed into a meaning other than PDSCH allocation. If the PDSCH-HARQ-ACK-Codebook corresponding to the target HARQ-ACK feedback configuration is dynamic, the information in the DAI field will be parsed, and the information parsed is at least used for determining a HARQ-ACK mapping order in HARQ-ACK feedbacks.

In a possible example, the first information field includes a PUCCH-resource-indicator field or a PDSCH-to-HARQ-_feedback timing indicator field. If a target first information field corresponding to the target HARQ-ACK feedback configuration has a length equal to the first information field in the first DCI, all bits in the first information field in the first DCI are parsed. If the target first information field corresponding to the target HARQ-ACK feedback configuration has a length less than the first information field in the first DCI, x_A most significant bits or x_A least significant bits in the first information field in the first DCI are parsed, where x_A is the length of the target first information field corresponding to the target HARQ-ACK feedback configuration.

The implementations of the present application further provides a chip. The chip includes a processor configured to invoke a computer program from a memory and run the computer program to cause a device equipped with the chip to carry out part of or all steps described for the terminal in the above method implementations.

The implementations of the present application further provides a computer-readable storage medium. The computer-readable storage medium stores a computer program for electronic data exchange. The computer program causes a computer to carry out part of or all steps described for the terminal in the above method implementations.

The implementations of the present application further provides a computer-readable storage medium. The computer-readable storage medium stores a computer program for electronic data exchange. The computer program causes a computer to carry out part of or all steps described for the network device in the above method implementations.

The implementations of the present application further provides a computer program product. The computer program product includes a computer program which is operable to cause a computer to carry out part of or all steps described for the terminal in the above method implementations. The computer program product may be a software installation package.

The steps of the method or algorithm described in the implementations of the present application may be implemented in hardware, or may be implemented in a manner in which a processor executes software instructions. Software instructions can be composed of corresponding software modules, which can be stored in random access memory (RAM), flash memory, read only memory (ROM), erasable programmable read-only memory (EPROM), electrically EPROM (EEPROM), register, hard disk, portable hard disk, CD-ROM, or any other form of storage medium known in the art. An exemplary storage medium is coupled to the processor, so that the processor can read information from the storage medium and can write information to the storage medium. Of course, the storage medium may also be a component of the processor. The processor and the storage medium may be located in the ASIC. In addition, the ASIC may be located in an access network device, a target network device, or a core network device. Of course, the processor and the storage medium may also present as discrete components in the access network device, the target network device, or the core network device.

Those skilled in the art should be aware that in one or more of the foregoing examples, the functions described in the implementations of the present application may be implemented in whole or in part by software, hardware, firmware, or any combination thereof. When implemented by software, it can be implemented in the form of a computer program product in whole or in part. The computer program product includes one or more computer instructions. When the computer program instructions are loaded and executed on a computer, the processes or functions described in the implementations of the present application are generated in whole or in part. The computer may be a general-purpose computer, a special-purpose computer, a computer network, or other programmable devices. The computer instructions may be stored in a computer-readable storage medium, or transmitted from one computer-readable storage medium to another computer-readable storage medium. For example, the computer instructions may be transmitted from a website, computer, server, or data center to another website, computer, server or data center via wired (such as coaxial cable, optical fiber, digital subscriber line (DSL)) or wireless (such as infrared, wireless, microwave, etc.) communication. The computer-readable storage medium may be any available medium that can be accessed by the computer or a data storage device such as a server or a data center integrated with one or more available media. The usable medium may be a magnetic medium (for example, a floppy disk, a hard disk, a magnetic tape), an optical medium (for example, a digital video disc (DVD)), or a semiconductor medium (for example, a solid state disk (SSD)), etc.

The detailed description described above further describe the purpose, technical solutions, and beneficial effects of the implementations of the present application in further detail. It should be understood that the foregoing descriptions are only specific implementations of the implementations of the present application, and are not used to limit the protection scope of the implementations of the present application. Any modification, equivalent replacement, improvement, etc. made on the basis of the technical solutions of the implementations of the present application shall be included in the protection scope of the implementations of the present application.

What is claimed is:

1. A method for determining an uplink control information (UCI) field, comprising:
   receiving, by a terminal, at least two Hybrid Automatic Repeat reQuest-acknowledgement (HARQ-ACK) feedback configurations; and
   receiving, by the terminal, first downlink control information (DCI), a length of a first information field in the first DCI being determined by the at least two HARQ-ACK feedback configurations, and the first information field being a field related to uplink control feedback in the first DCI;
   wherein first information of the terminal is used for indicating a target HARQ-ACK feedback configuration corresponding to the first DCI, wherein the target HARQ-ACK feedback configuration is one of the at least two HARQ-ACK feedback configurations;
   wherein the first information field comprises a DAI field, if a PDSCH-HARQ-ACK-Codebook corresponding to the target HARQ-ACK feedback configuration is semi-static, information in the DAI field will not be parsed, or the information in the DAI field will be parsed into a meaning other than PDSCH allocation; and if the PDSCH-HARQ-ACK-Codebook corresponding to the target HARQ-ACK feedback configuration is dynamic, the information in the DAI field will be parsed, and the information parsed is at least used for determining a HARQ-ACK mapping order in HARQ-ACK feedbacks; or wherein the first information field comprises a PUCCH-resource-indicator field or a PDSCH-to-HARQ_feedback timing indicator field, if a target first information field corresponding to the target HARQ-ACK feedback configuration has a length equal to the first information field in the first DCI, all bits in the first information field in the first DCI are parsed; and if the target first information field corresponding to the target HARQ-ACK feedback configuration has a length less than the first information field in the first DCI, x_A most significant bits or x_A least significant bits in the first information field in the first DCI are parsed, wherein x_A is the length of the target first information field corresponding to the target.

2. The method of claim 1, wherein the first information field in the first DCI comprises any of: a downlink assignment index (DAI) field, a physical uplink control channel resource indicator (PUCCH-resource-indicator) field, and a physical downlink share channel to HARQ feedback timing indicator (PDSCH-to-HARQ_feedback timing indicator) field.

3. The method of claim 1, wherein the length of the first information field in the first DCI is a maximum value of lengths of at least two reference first information fields, wherein the at least two reference first information fields are in one-to-one correspondence with the at least two HARQ-ACK feedback configurations.

4. The method of claim 1, wherein the first information comprises any of: a radio network temporary identifier (RNTI), a DCI field, and a resource set (CORESET)/search space.

5. A terminal, comprising:
a transceiver;
at least one processor; and
a memory storing one or more program codes which, when executed by the at least one processor, cause the at least one processor to make the transceiver to:
receive at least two Hybrid Automatic Repeat reQuest-acknowledgement (HARQ-ACK) feedback configurations; and
receive first downlink control information (DCI), a length of a first information field in the first DCI being determined by the at least two HARQ-ACK feedback configurations, and the first information field being a field related to uplink control feedback in the first DCI;
wherein first information of the terminal is used for indicating a target HARQ-ACK feedback configuration corresponding to the first DCI, wherein the target HARQ-ACK feedback configuration is one of the at least two HARQ-ACK feedback configurations;
wherein the first information field comprises a DAI field,
if a PDSCH-HARQ-ACK-Codebook corresponding to the target HARQ-ACK feedback configuration is semi-static, information in the DAI field will not be parsed, or the information in the DAI field will be parsed into a meaning other than PDSCH allocation; and if the PDSCH-HARQ-ACK-Codebook corresponding to the target HARQ-ACK feedback configuration is dynamic, the information in the DAI field will be parsed, and the information parsed is at least used for determining a HARQ-ACK mapping order in HARQ-ACK feedbacks; or wherein the first information field comprises a PUCCH-resource-indicator field or a PDSCH-to-HARQ_feedback timing indicator field, if a target first information field corresponding to the target HARQ-ACK feedback configuration has a length equal to the first information field in the first DCI, all bits in the first information field in the first DCI are parsed; and if the target first information field corresponding to the target HARQ-ACK feedback configuration has a length less than the first information field in the first DCI, x_A most significant bits or x_A least significant bits in the first information field in the first DCI are parsed, wherein x_A is the length of the target first information field corresponding to the target.

6. The terminal of claim 5, wherein the first information field in the first DCI comprises any of: a downlink assignment index (DAI) field, a physical uplink control channel resource indicator (PUCCH-resource-indicator) field, and a physical downlink share channel to HARQ feedback timing indicator (PDSCH-to-HARQ_feedback timing indicator) field.

7. The terminal of claim 5, wherein the length of the first information field in the first DCI is a maximum value of lengths of at least two reference first information fields, wherein the at least two reference first information fields are in one-to-one correspondence with the at least two HARQ-ACK feedback configurations.

8. A network device, comprising:
a transceiver;
at least one processor; and
a memory storing one or more program codes which, when executed by the at least one processor, cause the at least one processor to make the transceiver to:
transmit at least two Hybrid Automatic Repeat reQuest-acknowledgement (HARQ-ACK) feedback configurations to a terminal; and
transmit first downlink control information (DCI), a length of a first information field in the first DCI being determined by the at least two HARQ-ACK feedback configurations, and the first information field being a field related to uplink control feedback in the first DCI;
wherein first information of the terminal is used for indicating a target HARQ-ACK feedback configuration corresponding to the first DCI, wherein the target HARQ-ACK feedback configuration is one of the at least two HARQ-ACK feedback configurations;
wherein the first information field comprises a DAI field,
if a PDSCH-HARQ-ACK-Codebook corresponding to the target HARQ-ACK feedback configuration is semi-static, information in the DAI field will not be parsed, or the information in the DAI field will be parsed into a meaning other than PDSCH allocation; and if the PDSCH-HARQ-ACK-Codebook corresponding to the target HARQ-ACK feedback configuration is dynamic, the information in the DAI field will be parsed, and the information parsed is at least used for determining a HARQ-ACK mapping order in HARQ-ACK feedbacks; or wherein the first information field comprises a PUCCH-resource-indicator field or a PDSCH-to-HARQ_feedback timing indicator field,
- if a target first information field corresponding to the target HARQ-ACK feedback configuration has a length equal to the first information field in the first DCI, all bits in the first information field in the first DCI are parsed; and
- if the target first information field corresponding to the target HARQ-ACK feedback configuration has a length less than the first information field in the first DCI, x_A most significant bits or x_A least significant bits in the first information field in the first DCI are parsed, wherein x_A is the length of the target first information field corresponding to the target.

9. The network device of claim 8, wherein the first information field in the first DCI comprises any of: a downlink assignment index (DAI) field, a physical uplink control channel resource indicator (PUCCH-resource-indicator) field, and a physical downlink share channel to HARQ feedback timing indicator (PDSCH-to-HARQ feedback timing indicator) field.

10. The network device of claim 8, wherein the length of the first information field in the first DCI is a maximum value of lengths of at least two reference first information fields, wherein the at least two reference first information fields are in one-to-one correspondence with the at least two HARQ-ACK feedback configurations.

11. The network device of claim 8, wherein the first information comprises any of: a radio network temporary identifier (RNTI), a DCI field, and a resource set (CORESET)/search space.

* * * * *